United States Patent
Kelly et al.

(10) Patent No.: US 6,554,335 B1
(45) Date of Patent: Apr. 29, 2003

(54) PET WASTE COLLECTION SYSTEM

(76) Inventors: Kevin B. Kelly, 39 Stonewyck Dr., Hillsborough, NJ (US) 08844; Elisabeth A. Kelly, 39 Stonewyck Dr., Hillsborough, NJ (US) 08844

( * ) Notice: Subject to any disclaimer, the term of this patent is extended or adjusted under 35 U.S.C. 154(b) by 0 days.

(21) Appl. No.: 10/061,726

(22) Filed: Feb. 2, 2002

(51) Int. Cl.⁷ .............................................. A01K 29/00
(52) U.S. Cl. ........................................................ 294/15
(58) Field of Search .......................... 294/1.3–1.5, 19.1, 294/22, 55; 15/257.1, 257.6, 257.7; 119/161, 867; 248/95, 99

(56) References Cited

U.S. PATENT DOCUMENTS

| | | |
|---|---|---|
| 2,141,007 A | 4/1938 | Meeh |
| 3,052,214 A | 9/1962 | Johnson |
| 3,139,299 A | 6/1964 | Bowen |
| 3,281,178 A | 10/1966 | Fisher |
| 3,286,826 A | 11/1966 | Stoll |
| 3,431,008 A | 3/1969 | Narita |
| 3,446,525 A | 5/1969 | Jones |
| 3,560,039 A | 2/1971 | Gruber |
| 3,606,436 A | 9/1971 | Lynch |
| 3,659,891 A | 5/1972 | Pettenon et al. |
| 3,676,887 A | 7/1972 | Klein |
| 3,716,263 A | 2/1973 | Gatti |
| 3,757,737 A | 9/1973 | Drum et al. |
| 3,778,097 A | 12/1973 | Dorzan |
| 3,786,780 A | 1/1974 | Pezzino |
| 3,804,448 A | 4/1974 | Schmieler |
| 3,819,220 A | 6/1974 | Bredt |
| 4,019,768 A | 4/1977 | Niece |
| 4,215,887 A | 8/1980 | Boots |
| 4,243,259 A * | 1/1981 | Wright ........................ 294/1.3 |
| 4,323,272 A | 4/1982 | Fortier |
| 4,341,410 A | 7/1982 | Summach |
| 4,900,077 A * | 2/1990 | Beck ............................ 294/1.3 |
| 5,203,598 A * | 4/1993 | Lindlbauer ................... 294/1.4 |
| 5,269,575 A * | 12/1993 | Parvaresh .................... 294/1.5 |
| 5,290,080 A * | 3/1994 | Yoshioka ..................... 294/1.5 |
| 5,344,200 A * | 9/1994 | Yoshioka ..................... 294/1.5 |
| 5,634,678 A * | 6/1997 | Bailey ......................... 294/1.5 |
| 5,702,138 A * | 12/1997 | Elkind ......................... 294/1.4 |
| 6,039,370 A | 3/2000 | Dolley, Jr. et al. |

FOREIGN PATENT DOCUMENTS

| | | | | |
|---|---|---|---|---|
| DE | 2512203 | * | 9/1976 | ................ 294/1.3 |
| DE | 3809286 | * | 9/1989 | ................ 294/1.5 |
| NL | 7713350 | * | 9/1979 | ................ 294/1.5 |
| WO | 13268 | * | 7/1993 | ................ 294/1.4 |

* cited by examiner

Primary Examiner—Eileen D. Lillis
Assistant Examiner—Paul T. Chin
(74) Attorney, Agent, or Firm—Kenneth P. Glynn, Esq.

(57) ABSTRACT

The present invention is directed to a pet waste collection system for use with dogs, cats, and other pets to collect their solid waste. The present invention system includes a main housing having a hollow inside and having a top, a bottom, a front, and a back and at least one sidewall, and having an opening accessible to the hollow inside area. There is also a telescopically extendable and contractible pole attached at a first end to the hollow inside area of the main housing and attached to a collapsible frame at its second end. The collapsible frame unfolds for a waste receptacle, i.e. a "pooper" bag, and is spaced behind the pet during defecation. In some embodiments, an attachment hook is located on said main housing for attachment thereof to a leash, a belt, or other attachable area or item.

20 Claims, 3 Drawing Sheets

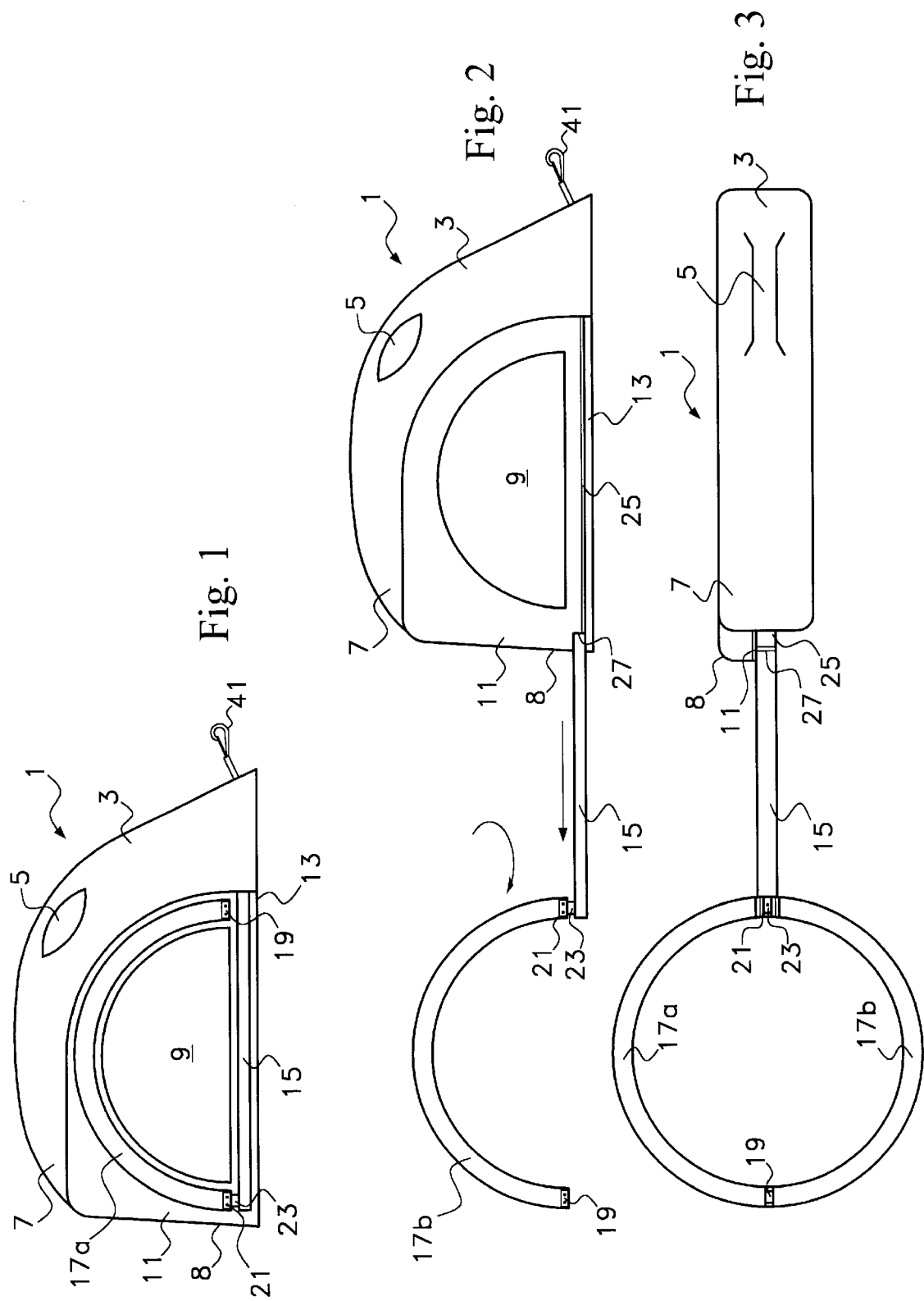

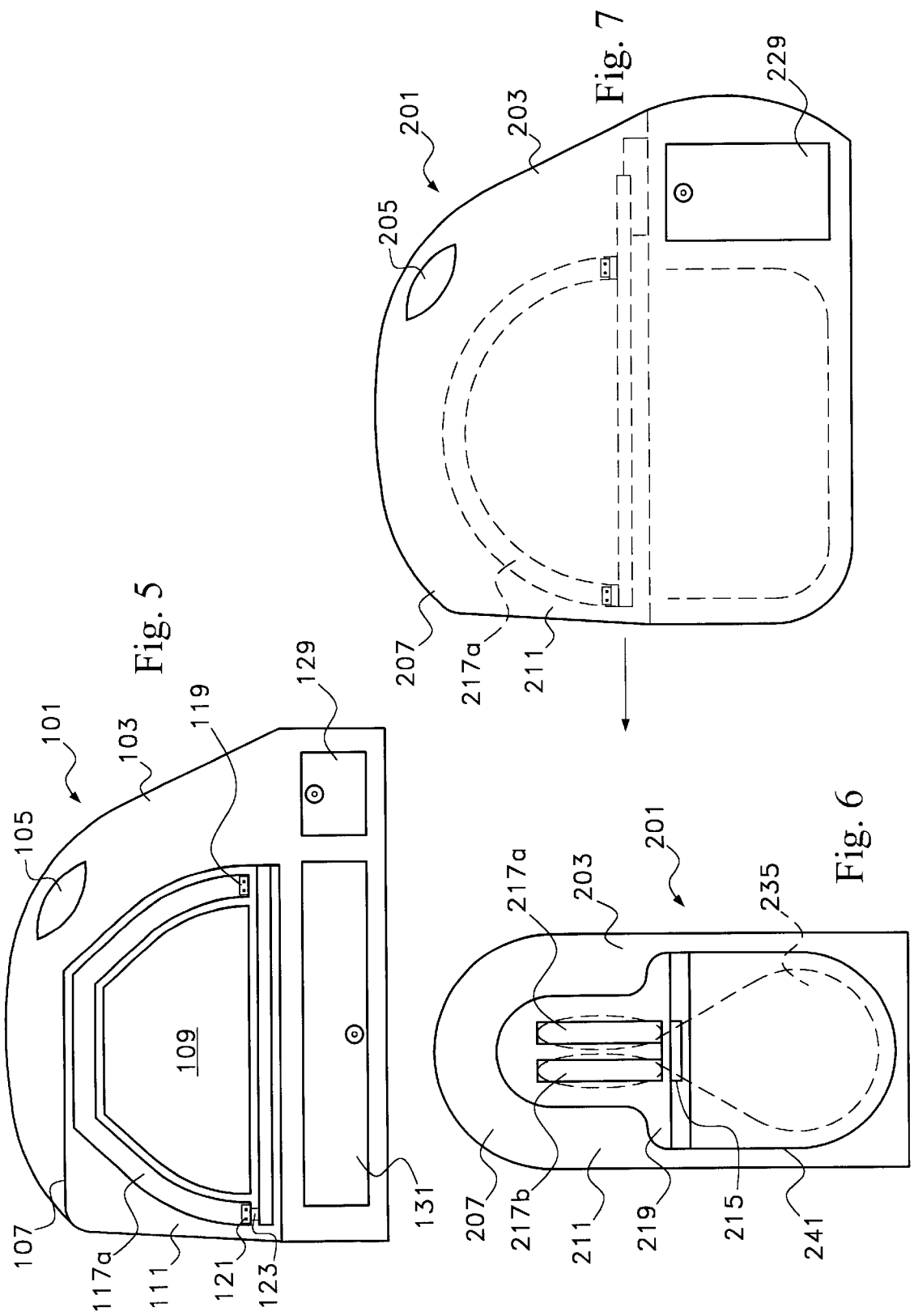

PET WASTE COLLECTION SYSTEM

BACKGROUND OF THE INVENTION

1. Field of the Invention

The present invention relates to collection of animal solid waste, and, more particularly for a system for collecting and securing animal waste of domesticated pets before it becomes an environmental/sanitation problem and/or a violation of law. More specifically, the present invention is directed to a combination device (system) for collecting pet waste as it is created, and for doing so in a clean, safe, elegant, discrete and efficient manner. The present invention system provides for compact storage, yet expandability for use, and enables a user to readily collect and transport the waste without having hands near the posterior of the pet during defecation/collection.

2. Information Disclosure Statement

The following patents illustrate various prior art devices and methods of collecting pet waste:

U.S. Pat. No. 2,141,007 describes a shovel comprising walls forming an enclosure open at one end and closed at the opposite end, a sleeve rigid with the closed end of the shovel angularly and rearwardly therefrom, a pair of longitudinally spaced flanges integral with said sleeve, a collar rotatably mounted around the sleeve between said flanges and held from longitudinal movement thereby, a handle extending into and rigidly attached to said sleeve and projecting upwardly and rearwardly therefrom, and a rotary sleeve mounted on the outer end of said handle approximately at right angles to said first named sleeve and facilitating turning of the shovel to extend the open end thereof downwardly and discharge the contents therefrom.

U.S. Pat. No. 3,052,214 describes a disposable catcher for trapping and containing excrement and the like for disposal thereof, said catcher comprising, in combination, a bag holding and operating means comprising a stick, said stick comprising connecting rod and a connecting tubular rod holder disposed therearound to limit movement of said rod between a forward lid open and a rearward lid closed position, and a disposable bag readily detachably connected to said stick, said bag comprising a disposable bag body and a movable lid, said lid being readily detachably connected to said connecting rod and said bag body being detachably connected in supporting position to said connecting rod holder, whereby said lid can be moved to open and closed positions by movement of said connecting rod, said bag being readily detached from said stick by detachment of said lid and said bag body from said connecting rod and connecting rod holder, respectively.

U.S. Pat. No. 3,139,299 describes a refuse collector, comprising in combination: an elongated and vertically extending tube element, said tube having an outlet at the bottom thereof; an elongated element in longitudinal sliding in relationship and by the tube element, one of said elements being rigid and having a handle section for manipulating the collector; a bowl carried by and at the lower end of one of said elements; a scoop for the bowl; means for pivotally connecting the scoop to both of said elements; means coupling the upper end of the tube with a source of fluid; and a manually actuated valve carried by the tube for controlling the flow of liquid through the tube.

U.S. Pat. No. 3,281,178 describes a device for collecting and disposing of animal fecal matter, comprising, in combination, a handle, a first frame element, a second frame element, one end portion of said first frame element being spaced apart from and oppositely positioned with respect to one end portion of said second frame element, the other end portion of said first frame element being connected to said second frame element, said handle member being transversely positioned with respect to both said first frame element and second frame element and being connected to said connected first and second frame elements, and a bag member removably attached to said connected first and second frame elements at their respective one end portions spaced apart from and oppositely positioned with respect to each other, said bag member having a collar and a body portion integral with said collar, said collar being sealed to said body portion at least two opposite points thereof, each of said two opposite points being between said two spaced apart and oppositely positioned end portions of said first and second frame elements, said collar being positioned over said two spaced apart and oppositely positioned end portions of said first and second frame elements, said body portion being positioned between said first and second frame elements, whereby said device can be easily used without any fecal matter to be collected contacting the frame elements and whereby said bag member can be easily removed and then closed and sealed by raising and inverting one side of said collar.

U.S. Pat. No. 3,286,826 describes a portable combination flat package for use in removing dog refuse from an area in which it is deposited including: a flexible fibrous container in the form of a sack having an open end that is defined by first and second flat side walls, two end walls and a bottom, with said end walls and bottom having centrally disposed fold lines formed therein that extend the length thereof, and said first side wall includes as an integral part thereof an extension that projects beyond said open end, which container is selectively disposable in either a first position in which it is flattened, a second positioned in which it is expanded to receive dog refuse through said open end when said extension is placed in contact with the surface on which said refuse rests, and a third position in which said container is rolled upon itself with said refuse within the confines thereof, with said extension when said container is in said third position being wrapped thereabout to seal the same; a rectangular sheet of cardboard of substantial stiffness disposed within said container when in said first position to prevent lateral creasing of said container, which sheet has a plurality of spaced fold lines formed therein that extend longitudinally and transversely therein which aid in shaping said sheet into a scoop when said sheet is removed from said container, and when said sheet is so shaped it defines two parallel longitudinally extending flanged that act as stiffeners, in the use of said scoop to pick up refuse and deposit the same together with said sheet in said container when in said second position; and, tie means within said container in said third position for holding said container in said third position with said refuse and sheet within the confines thereof with said extension being wrapped around said container to seal the same.

U.S. Pat. No. 3,431,008 describes a portable scavenging apparatus for removing feces of animals and other untouchable objects comprising a box having an opening therein and a lid adapted to selectively close and open said opening, a stick having a first end mounted to a wall of said box, means for moving said lid selectively between its closed and open positions including a lever, a link, an arm, and a spring, said lever being pivotally mounted at a predetermined point intermediate its ends to said stick at a predetermined point adjacent the second end of said stick, a handle mounted in fixed position to said stick to provide a stationary member toward which one end of said lever may be manually pivoted, said spring being interposed between said handle and said lever to normally urge said one end of said lever away from said handle, said link being attached to the opposite end of said lever so as not to be moved away from said handle when said lever is manually pivoted toward said handle, said link being mounted to said arm and said arm being operative when said lever and said link are moved to move said lid between its closed and open positions.

U.S. Pat. No. 3,446,525 describes in a portable pickup device for grasping and transporting unclean material such as animal droppings and the like, said device having an elongated body provided with a handle at one end: pickup means carried at the other end of the body including a pair of pickup members in virtually parallel planes, said pair of pickup members including parallel bottom straight portions cooperable to move along a surface in close relation thereto whereby at least one straight portion is adapted to move beneath a dropping to be picked up, at least one of said pickup members being an open frame; means for moving at least one of the pickup members to and away from the other; and a disposable compliant wrapping means received and held on said pickup means with an opening at said bottom portions, the open frame pickup member being adapted to permit outward lateral displacement of said compliant wrapping means when a dropping is lifted by said straight portions of the pickup means for containing the dropping in said wrapping means at one side of the pickup means.

U.S. Pat. No. 3,560,039 describes an apparatus for handling and disposing of animal excrement and the like comprising in combination a tong member including a pair of levers pivotally connected together intermediate their ends, loop handle portions at one end of each of said levers, the other end of each of said levers having a transverse elongated scoop portion which curves concavely inwardly toward the opposite lever whereby said scoop portions form a closed-end scoop when said long end member is in the closed position, and tissue-retaining means on said tong member for retaining a package of tissues therein, said tissue retaining means including a receptacle connected to one of said pair of levers and a removable cover on said receptacle having an opening therein for the removal of tissues from said receptacle.

U.S. Pat. No. 3,606,436 describes a portable device for picking up objects underfoot comprising: a first assemblage including a first blade-like member secured to the lower end of a first operating rod and projecting angularly therefrom; a second assemblage including a second blade-like member secured to the lower end of a second operating rod and projecting angularly therefrom; hinging means pivotally interconnecting said first and second assemblages for pincers-like movement of said blade-like members upon manipulation of said operating rods; and, a bag having a portion of its open end detachably secured to said first blade-like member, another portion of its open end detachably secured to said second blade-like member, and a portion of its closed end detachably secured to one of said operating rods so that the inverted bag is selectively opened and closed by the pinchers-like movement of said blade-like members resulting from manipulation of said operating rods.

U.S. Pat. No. 3,659,891 describes a refuse collecting device having an improved tubular bag-mounting member at the lower end of a handle for collecting refuse such as animal leavings and the like. The refuse is collected in a disposable bag removably mounted on the tubular element in an improved manner for positive association with the tubular element during use while yet providing for facilitated withdrawal of the bagged matter in a sanitary manner.

U.S. Pat. No. 3,676,887 describes a flexible bag body portion that has a substantially rigid blade element permanently attached to one side wall thereof adjacent the open mouth of the bag body portion. A flexible closure flap is carried by the opposite side wall of the bag body portion and has an adhesive sealing area coact with a like area on the side wall of the body portion carrying the blade element. The bag is sealed with the litter and the blade element therein prior to disposal.

U.S. Pat. No. 3,716,263 describes a device for collecting articles and substances, comprising in combination: a handle; an adjustable shaft surmounted by said handle; a pair of outwardly inclined arms depending from said adjustable shaft; pivotal means depending from said arms; said pivotal means being normally maintained in an inclined, open position by spring means depending from said arms; said pivotable means being disposable into a horizontal, closed position when said pivotable means are in abutment with a surface and said handle is depressed; descendable means depending from said arms and contactable with said pivotable means when it is in said closed position, thereby obstructing the return of said pivotable means from said closed to said open position.

U.S. Pat. No. 3,757,737 describes a mechanical device for sequentially loading multiple bodies of animal dropping from the ground in to a disposable bag. The illustrated device has an elongated handle which carries a pickup means at its lower end. The pickup means includes means for releasably holding a bag with the mouth of the bag held open in a generally vertical plane, and a movable paddle proportioned and arranged to engage and propel a body of animal droppings into the bag through the open mouth. The movement of the paddle is remotely controlled from the upper end of the handle by a manually movable lever which is operable to impart a rapid propelling movement to the paddle.

U.S. Pat. No. 3,778,097 describes a device for retrieving litter that has manually actuated positioning means connected to a litter receptacle holder and a pushing member adapted to be enclosed in an envelope releasably secured about the pushing member. Actuation of the positioning means causes coaction between a litter receptacle mounted in the litter receptacle holder and the enveloped pushing member, so that litter is forced into the litter receptacle and held in the litter receptacle by the pushing surface. While the litter is being held within the litter receptacle by the enveloped pushing member, the envelope is released from about the pushing member and reversed to envelope the opening of the litter receptacle. The litter receptacle can then be manually ejected into the envelope when the positioning means are actuated to move the pushing member away from the litter receptacle.

U.S. Pat. No. 3,786,780 describes a portable canine toilet, in combination a holder and disposable waste receiving means adapted to be removably fitted upon the holder. The holder has a projecting means mounted on its rod portion, and the receiving means has a partially circumferential sleeve along its upper portion and into which the lower part of the holder is inserted. The receiving means also has a stringed collar at the top of the upper portion, the protruding portion of the string normally positioned on the projecting means.

U.S. Pat. No. 3,804,448 describes an elongated light weight shaft that has at one end a handgrip portion and at the other end a scavenging scoop receptacle with an inlet opening facing transversely of the length of the shaft. An electric light on or near the handgrip portion illuminates the receptacle inlet and the locale adjacent thereto. The implement may be manipulated by one hand of a user while the user is standing in his normal upright position. The scoop receptacle may include, or support, a detachable disposable container or liner. A closure lid is hingedly mounted relative to the scoop receptacle so that the lid can be moved into an open position while the receptacle is in scooping position and into closed position upon completion of the scooping operation, selectively, by manipulation of the shaft by the supporting hand of user. A pusher tool or brush is carried by the shaft near the receptacle. Propelling means are provided in the receptacle and are operable manually to propel the material scooped into the entry of the receptacle farther into the receptacle and away from the inlet opening so that the material can be carried in the receptacle without danger of spillage even with the shaft carried substantially upright.

U.S. Pat. No. 3,819,220 describes a sanitary device for pets which comprises a wand having at one end a pair of spring arms which normally are biased apart. A disposable receptacle having sleeve portions around its normally open top has such portions fitted on said arms to be held open thereby and positioned beneath a pet to receive feces as the latter is discharged. The receptacle is fitted on the arms; the arms squeezed together, the receptacle wrapped around the arms and a sleeve telescoped on the wand to retain the device in readiness. After use, the receptacle may be expelled from the arms by extending the sleeve.

U.S. Pat. No. 4,019,768 describes a device for sanitary pickup of ground deposited excrement comprises a metal frame structure having an excrement engaging pickup portion and a conventional bag supporting portion. Said bag holding portion positively retains a conventional shopping bag on the holding portion in a manner to hold the mouth of the bag open for ready reception of the said excrement together with additional structure supported by the handle for quick and easy release of said bag from positive retention on the support portion. Additional covers are also provided for the excrement engaging portion of the device to increase the usefulness of said device.

U.S. Pat. No. 4,215,887 describes a pickup device of highly functional yet inexpensive construction, comprising a pair of loop-shaped portions that are hinged together, with the loop-shaped portions being movable to a widely separated position such that an inverted bag that has been partially turned inside out may be inserted between the loops. Handle portions located above the hinge locations are able to be grasped by the user and brought together, with such action serving to bring base portions of the loops, as well as certain neck portions of the bag together. This action makes the device readily adaptable for the picking up of material from a floor or sidewalk, such as that deposited by an animal, with this arrangement advantageously serving to cause the removed material to be enveloped in the bottom portion of the bag, with the upper portions of the bag thereafter being easily brought together and tied, and with the exterior of the bag and the pickup device remaining unsoiled throughout the entire procedure.

U.S. Pat. No. 4,323,272 describes a hand portable and single hand operable device for picking up animal excrement and the like comprised of a pair of metal rods fixed close enough together at one end as V shaped extensions from a spring loop to form a handle portion for grasping with one hand about both rods which are deflectable toward each other by pressure of the hand. At the other end of each of the rods is a bag support member comprised of an elongated bag support wire loop formation having two substantially parallel width portions and two opposed length portions with length portions farthest from the handle portion in each bag support loop formation being straight and parallel to each other and moveable toward each other into line contact with each other by deflection of the rods. A bag having flexible sidewalls and an opening with a cuff is mounted on the respective bag support wire loop formation in a manner that the opening is at and controlled by the parallel straight portions of the bag support loop formations.

U.S. Pat. No. 4,341,410 describes a frame that comprises a handle and a pair of legs extending therefrom with the handle being substantially U-shaped and having a taut wire spanning the distal ends of the legs. A plastic or paper bag is engaged between the legs with one side of the open end folded over the taut wire and the legs and the forefinger of the hand holding the handle engaging the other side of the open end and tensioning the same against the wire. This holds the bag in the open position. The primary use is for scooping up waste material from animals such as dogs but it can also be used to hold a bag upright in the open position with one hand so that the bag can be filled with material by the other hand. It can also be used in industry for sanitary sampling of granular, comminuted, or liquid materials. In one embodiment the frame is foldable for easy storage.

U.S. Pat. No. 6,039,370 describes a portable pet toilet having an elongated pole having first and second ends. The first end provides a handle. Securely mounted on the second end of the pole is a pair of selectively adjustable arms for supporting a disposable receptacle. The arms are adjustable in order to provide the capability of accommodating receptacles of different sizes and shape.

Notwithstanding the prior art, the present invention is neither taught nor rendered obvious thereby.

SUMMARY OF THE INVENTION

The present invention is directed to a pet waste collection system for use with dogs, cats, and other pets to collect their solid waste, as it is being deposited. The present invention system includes a main housing having a hollow inside and having a top, a bottom, a front, and a back and at least one sidewall, and having an opening accessible to the hollow inside area. There is also a telescopically extendable and contractible pole attached at a first end to the hollow inside area of the main housing and attached to a collapsible frame at its second end. This pole may be a single unit attached to a slide on a rail for telescoping, or it may be a plurality of interconnected telescoping poles. Additionally, there is a collapsible frame for a waste receptacle, i.e. a "pooper" bag, which is formed of at least two hingedly connected frame sections, the collapsible frame is attached to the second end of the pole, i.e. at its outwardly extendable end. In some embodiments, when the telescoping pole and collapsible frame are deployed, the collapsible frame is intended to be held at a position that is parallel to the ground. Thus, the collapsible frame will be attached at an angle of between 120° to 135° to the telescoping poles to ensure ease of use and ergonomic design.

In some embodiments, the collapsible frame is rotatably connected to the pole to permit swing out rotation in at least a 180 degree rotation. In other words, to minimize length for storage, the frame folds up, e.g. two halves folding together, and then swings inward to rest over the pole. In some embodiments, the pole and frame slide in and out of a fronted opening, while in other embodiments, the main housing includes a recessed wall adapted for nesting of the collapsible frame positioned above the pole, when in a contracted position. The waste receptacle is affixed to the collapsible frame prior to use. The collapsible frame is extended from the housing and opened. The waste receptacle is placed over the collapsible frame to form a pouch for collecting the animal waste. The collapsible frame with the waste receptacle thereon, may be used immediately or retracted and stored in place until needed.

Because the "pooper" bags, or more formally waste receptacles, are typically disposed of after each excursion, some present invention preferred embodiment systems are designed so that the main housing includes a waste receptacle storage area for storing a plurality of unused waste receptacles. This may be located in the top, side, front, or bottom, and may be a well, a drawer, a bin, or other storage area. In some cases, the waste receptacle storage area is located in a position on the main housing which is surrounded by the above-mentioned recessed wall area. Generally, the storage area is an enclosed area with open/close access.

In some embodiments, with or without the unused receptacle storage area, there is also a used waste receptacle holding area for holding the used, soiled receptacle in the system until the user gets to a convenient disposal location, e.g. a trashcan. Waste is held secure and "leak proof" by virtue of opposing sides of the collapsible frame pressing against each other when collapsed, thus sealing the waste inside the receptacle. Thus, this system puts waste out of sight and reduces or eliminates odors. This holding area may be similar to the unused receptacle storage area or it may be different, and it may be an enclosed area with open/close access.

No matter how constructed, a key benefit is the ability to re-use/re-deploy an already soiled waste receptacle. In some preferred embodiments, the holding area for the used receptacle is located below the pole and may remain attached to the folded frame. This would be achieved by providing a larger opening at the front or side of the main housing below the contracted pole location.

In some embodiments, an attachment hook is located on said main housing for attachment thereof to a leash, a belt, or other attachable area or item.

In some embodiments, a flashlight is built into the front/top of the main housing to project light onto the area where the collapsible frame is to be used. Similarly, a fiber optic cable could be deployed down through the telescoping pole and into the collapsible frame to light the frame and project light to the ground.

Materials of construction are generally a matter of choice, but the main housing is ideally made of a plastic material. This is durable inexpensive, washable, lightweight, and non-corrosive.

BRIEF DESCRIPTION OF THE DRAWINGS

The present invention should be more fully understood when the specification herein is taken in conjunction with the drawings appended hereto wherein:

FIG. 1 shows a side view of a present invention pet waste collection system wherein there is a side recess for receiving with a retracted pole with the collapsed, swung in frame;

FIGS. 2, 3, and 4 show the present invention pet waste collection system of FIG. 1 in the three stages of (a) with extension pulled and folded frame swung out, (b) with the frame opened, and (c) with the waste receptacle in place, respectively;

FIG. 5 shows a side view of an alternative embodiment present invention pet waste collection system with various compartments; and FIGS. 6 and 7 show a front and side view of yet another alternative embodiment of present invention pet waste collection system with a wide front opening for retracting and storing used waste receptacles.

DETAILED DESCRIPTION OF THE PRESENT INVENTION

Figure 4:
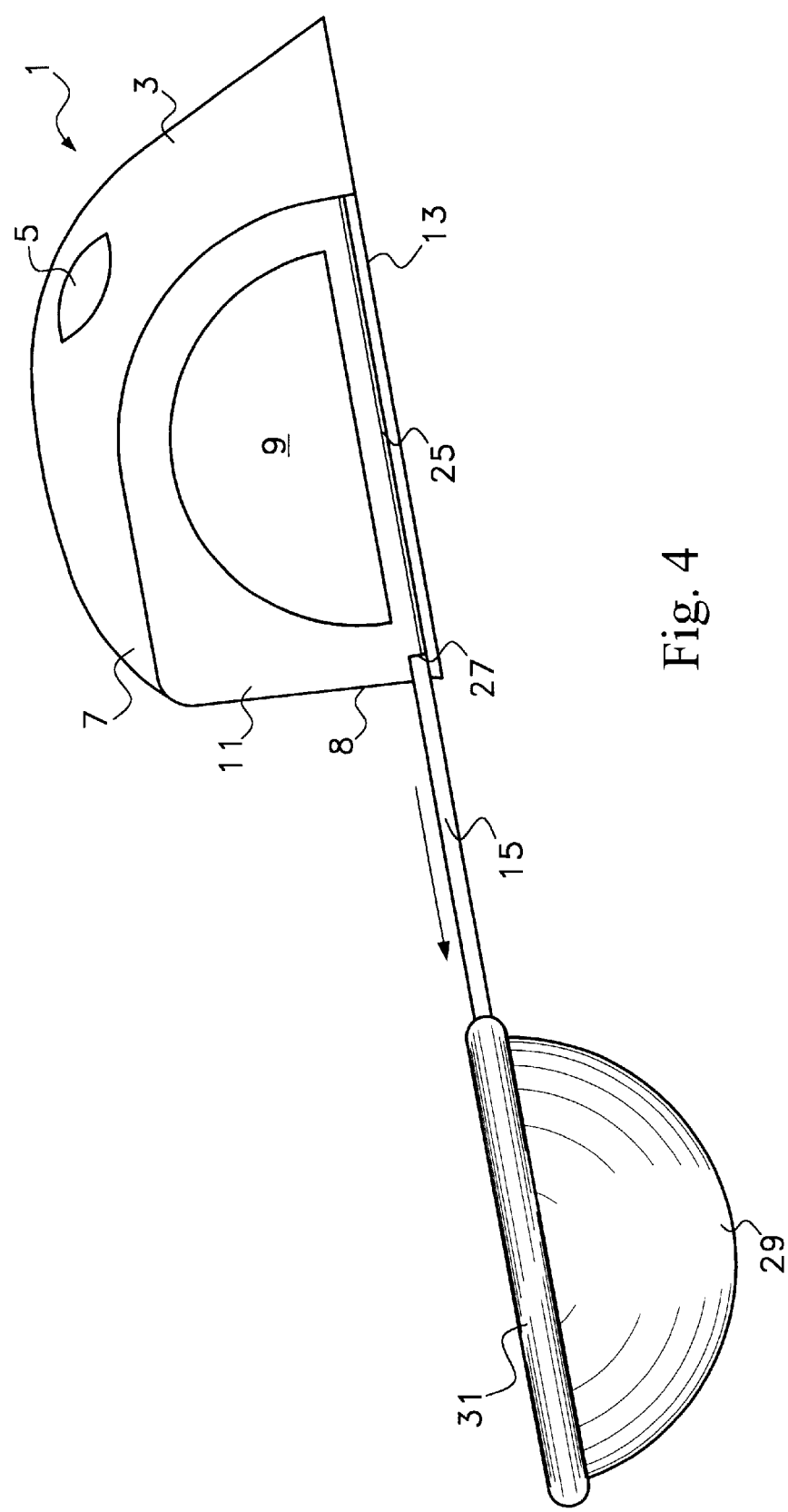

FIG. 1 shows a side view of a present invention pet waste collection system 1, having a main housing 3 with a hollow inside. There is a built-in handle 5, for holding and carrying, as well as a clip 41 for attachment to another object or device, e.g., a leash. There is a top 7, which extends to a front 8, a recessed sidewall 11, and a bottom 13. A raised portion 9 on sidewall 11 is encompassed by two frame sections 17a (and 17b in the Figures below). The collapsed frame sections are hingedly connected to one another with hinges 19 and 21 so as to fold and unfold (fold into two halves and unfold into an open circle). The frame sections are rotatably connected by shaft 23 to retractable pole 15, which is itself slidably connected to main housing 3. Pole 15 may have a push button-based releasable catch (not shown) to hold it in its rest position when not in use. Raised portion 9, or other areas of the main housing 3 could be used for storage space, e.g., for bags, or for pet related devices—snacks, brush, etc. and may have an open slot, a well, or open area access, or may have a door or other closable member.

Taking all of FIGS. 1, 2, 3, and 4 together, identical elements are identically numbered. FIG. 1 shows the frame sections folded together and swung into pole 15 and pole 15 is fully retracted. Thus, FIG. 1 shows the system in its storage mode.

FIG. 2 shows the pole 15 extended along track 25, with stop 27, and the two frame sections 17a and 17b still folded into one another, but now swung outwardly from pole 15. FIG. 3 shows a top view, with the same configuration as FIG. 2, except that frame sections 17a and 17b are unfolded to form a circular frame to support a waste receptacle, such as a plastic or wax paper bag. The bag may be attached by any available means, such as a clip, latch or other mechanical means, but self-attaching bags are preferred, e.g., with adhesive strips so that the bag may be curled over the frame and stuck to itself or the frame. The adhesive should be sticky enough to hold during use, but releasable for removal when finished. Bags may be constructed so that they have a rim that forms a sleeve that goes over the frame section and is held in place by gravity and tension when the frames are opened away from each other.

FIG. 4 shows the system ready for placement under the posterior of the pet about to defecate. It now includes a waste receptacle 29 with a folded over adhesive-based top 31 attached to the frame for receipt of the waste. The bag may be folded with the frame sections, i. e., closed, until a convenient disposal location is attained to contain the sight and odor of the pet's deposit.

Referring now to FIG. 5, it shows a side view of an alternative embodiment present invention pet waste collection system 101 with various compartments for enhancement of efficiency in use. It includes frame sections 117a and 117b, hinges 119 and 121, and rotatable shaft connection 123. Here, system 101 includes a main housing 103 and handle 105 with a top 107, a front and a recessed sidewall 111 with raised portion 109. In this embodiment, there is a first compartment 129, with a door or drawer, for storage of a plurality of unused bags. Likewise, a second compartment 131 is provided with a drawer or door and may be utilized to temporarily store a used receptacle (bag) with pet waste (feces) until it may be properly disposed. In preferred embodiments, the receptacles are resealable after use to contain odor and exposure and these are easily stored in compartment 131 until properly discarded.

FIGS. 6 and 7 show a front and side view of yet another alternative embodiment of present invention pet waste collection system 201 with a wide front opening for retracting and storing used waste receptacles while still on the frame. The main housing 203 has a handle 205, a top 207, a front 211 and a front opening 219, shaped as shown with a wider area at the lower half 241. Frame sections, e.g. sections 217a, 217b are hingedly connected to one another and are optionally rotatably connected to pole 215, itself retractably connected to the main housing 203. There is a receptacle supply compartment 229. In this embodiment, a user will fold up the frame sections 217a and 217b, leave the receptacle 235 folded and hanging, containing waste or still empty, and slide it into main housing 203 with the frame and pole 215, for storage until an appropriate disposal locale is reached, as shown in FIG. 6. In this manner, the used receptacle is stored inside the main housing out of view until disposed of.

Obviously, numerous modifications and variations of the present invention are possible in light of the above teachings. For example, the frame section configuration may be longer or smaller, depending on the size of the pet, may have any geometric configuration, and may even be adjustable in size. It is therefore understood that within the scope of the appended claims, the invention may be practiced otherwise than as specifically described herein.

What is claimed is:

1. A pet waste collection system, which comprises:
   (a) a main housing having a hollow inside area and having a top, a bottom, a front, and a back and at least one sidewall, and having an opening accessible to said hollow inside area, said main housing further including a recessed wall area adapted for nesting of a collapsible frame and positioned separately from a pole when said pole is in a contracted position;
   (b) a telescopically extendable and contractible pole attached at a first end to said hollow inside area of said main housing and attached to a collapsible frame at a second end, and having an extended position wherein said pole and said collapsible frame are located outside of said hollow inside area and a contacted position wherein said pole and said collapsible frame are located inside of and nested in said hollow inside area;
   (c) a collapsible frame for a waste receptacle, which is formed of at least two hingedly, connected frame sections, and rotatably attached to said second end of said pole.

2. The pet waste collection system of claim 1 wherein said collapsible frame is rotatably connected to said pole to permit swing out rotation in at least a 180 degree rotation.

3. The pet waste collection system of claim 1 wherein said main housing includes a waste receptacle storage area for storing a plurality of unused waste receptacles.

4. The pet waste collection system of claim 3 wherein said main housing includes a waste receptacle storage area which is located in a position on said main housing which is below said recessed wall area.

5. The pet waste collection system of claim 4 wherein said storage area is an enclosed area with open/close access.

6. The pet waste collection system of claim 3 wherein said storage area is an enclosed area with open/close access.

7. The pet waste collection system of claim 1 wherein said main housing includes a used waste receptacle holding area.

8. The pet waste collection system of claim 7 wherein said holding area is an enclosed area with open/close access.

9. The pet waste collection system of claim 7 wherein said holding area is located below said pole.

10. The pet waste collection system of claim 1 wherein said frame sections have a deployed position, and when in said deployed position, said frame sections and said pole form an angle of about 120 degrees to about 135 degrees.

11. The pet waste collection system of claim 1 wherein said main housing is made of a plastic material.

12. The pet waste collection system of claim 1 wherein an attachment hook is located on said main housing for attachment thereof to a leash.

13. A pet waste collection system, which comprises:
   (a) a main housing having a hollow area inside and having a top, a bottom, a front, and a back and two sidewalls, and having an opening accessible to said hollow inside area located at said front;
   (b) a telescopically extendable and contractible pole attached at a first end to said hollow inside area of said main housing and attached to a collapsible frame at a second end and adapted to extend outwardly through said opening; and having an extended position wherein said pole and said collapsible frame are located outside of said hollow inside area and a contacted position wherein said pole and said collapsible frame are located inside of and nested in said hollow inside area;,
   (c) a collapsible frame for a waste receptacle which is formed of a at least two hingedly connected frame sections, wherein said collapsible frame is rotatably connected to said pole to permit swing out rotation in at least a 180 degree rotation.

14. The pet waste collection system of claim 13 wherein said main housing includes a waste receptacle storage area for storing a plurality of unused waste receptacles.

15. The pet waste collection system of claim 14 wherein said storage area is an enclosed area with open/close access.

16. The pet waste collection system of claim 13 wherein said main housing includes a used waste receptacle holding area.

17. The pet waste collection system of claim 16 wherein said holding area is an enclosed area with open/close access.

18. The pet waste collection system of claim 13 wherein said main housing is made of a plastic material.

19. The pet waste collection system of claim 15 wherein said main housing is made of a plastic material.

20. The pet waste collection system of claim 13 wherein an attachment hook is located on said main housing for attachment thereof to a leash.

* * * * *